Patented Apr. 12, 1932

1,853,920

UNITED STATES PATENT OFFICE

JACQUE C. MORRELL, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

REFINING OF PETROLEUM OILS

No Drawing. Original application filed December 9, 1925, Serial No. 74,395. Divided and this application filed November 28, 1927. Serial No. 236,377.

This invention relates to improvements in the refining of petroleum oils, and refers more particularly to the subjection of the lighter gravity liquid products produced in petroleum distillation and cracking to the action of various refining agents for the purpose of removing or converting objectionable color-forming, odor-forming, sulphur and analogous objectionable compounds.

This application is a division of a former application Serial No. 74,395 filed December 9th, 1925.

The essence of the present invention resides in the utilization, as a refining agent, of substantially sulphur-free inorganic or organic acids, or a combination of organic and inorganic acids as the sole refining agent, or in combination with any other suitable refining agent or any combination of refining agents to accomplish the purpose above set forth.

I have discovered that when the lighter gravity liquid products produced in petroleum distillation and cracking are subjected to the action of concentrated sulphuric acid, for the purpose of refining and removing objectionable compounds, the strength of the concentrated acid produces an objectionable reaction, namely, the oxidation of compounds present, particularly in cracked distillates, reacting in such manner as to leave in the refined oil substances which bring about an unstable condition in the oil with respect to color and odor.

To overcome this objection, various experiments were carried out, and I have discovered that it is possible to substitute for the concentrated sulphuric acid substantially sulphur-free inorganic or organic acids, either alone or in combination. Further, it is possible to overcome the objections pointed out by preceding the treatment with concentrated sulphuric acid with the step of subjecting the oil to the action of the substantially sulphur-free acids above set forth.

It may be pointed out that it is the essence of the present invention to use, essentially as a refining agent, the substantially sulphur-free organic or inorganic acids herein set out, in combination with concentrated sulphuric acid, which of course, includes the step of subjecting the oil first to the action of the substantially sulphur-free acids before described and then to the sulphuric acid treatment.

The invention contemplates the use of these refining agents, either of themselves or as separate steps, in a method of refining the oil, in combination with other treating agents including plumbite (litharge dissolved in an alkaline solution such as sodium hydroxide, potassium hydroxide, and others), caustic soda, and other alkalies, earthy adsorbent agents, copper salts and the like.

By the term "substantially sulphur-free acids" as used in the specification and claims, I mean an acid which contains no sulphur in its molecular composition. This term does not refer to the presence of small or accidental amounts of sulphur present in the materials from which the acid was made or introduced during the course of commercial manufacture, in other words, it does not refer to impurities which contain sulphur.

Among some of the inorganic acids contemplated for use in the present invention may be listed nitric acid, hydrochloric acid, orthophosphoric acid, pyrophosphoric acid and metaphosphoric acid. These inorganic acids pointed out may be used alone or may be mixed with each other. For instance, one mixture of inorganic acids which has been found suitable for the purpose comprises a small proportion of nitric acid in one of the phosphoric acids.

Among the organic acids contemplated by the present invention may be listed the following: Acetic (preferably glacial), chloracetic, citric, tartaric and the like. These organic acids may be used alone or in combination with each other in suitable proportions, and the invention also contemplates that the organic acids may be mixed with the inorganic acids. As an illustrative example of the proportions in which these acids are mixed, phosphoric acid and acetic acid may be taken, as an example. Preferably, the acetic acid in the mixture is always less than 50% by volume of the mixture especially where the glacial acetic acid is used, for the reason that this acid is soluble in the oil and requires a larger proportion of phosphoric acid to reduce this solubility. This points out that the properties of these acids must be considered in their use. Another suitable mixture is the introduction of a small percentage of nitric acid, for example 5 to 10% with phosphoric acid or with acetic acid. The percentage of nitric acid, while not limited to the amount shown, must be kept as a smaller percentage relatively to the other acid in order to cut down its oxidizing properties, and thus obtain the benefits of the mixed acids.

The present invention contemplates more particularly the refining of what are known as cracked distillates, and more particularly those cracked overhead products of end boiling point commercially satisfactory to the trade which are produced directly from the cracking process.

I claim as my invention:

1. Steps in the process of refining a lighter gravity liquid product produced from the cracking of petroleum oil, comprising subjecting the oil first to the action of phosphoric acid, and then to the action of concentrated sulphuric acid, to remove or convert objectionable compounds present in said lighter gravity liquid product.

2. Steps in the process of refining petroleum oil, comprising subjecting the oil first to the action of phosphoric acid, and then to the action of concentrated sulphuric acid, to remove or convert objectionable compounds present in said petroleum oil.

In testimony whereof I affix my signature.

JACQUE C. MORRELL.